(12) United States Patent
Willden et al.

(10) Patent No.: US 7,118,370 B2
(45) Date of Patent: Oct. 10, 2006

(54) COMPOSITE SPAR DRAPE FORMING MACHINE

(75) Inventors: Kurtis S. Willden, Kent, WA (US); Raymond N. Henderson, Federal Way, WA (US); Gary E. Pfitzner, Issaquah, WA (US); Surendra R. Parekh, Auburn, WA (US); Christopher G. Harris, Auburn, WA (US)

(73) Assignee: The Boeing Company, Chicago, IL (US)

( * ) Notice: Subject to any disclaimer, the term of this patent is extended or adjusted under 35 U.S.C. 154(b) by 302 days.

(21) Appl. No.: 10/233,269

(22) Filed: Aug. 30, 2002

(65) Prior Publication Data

US 2004/0041304 A1    Mar. 4, 2004

(51) Int. Cl.
B29C 70/44 (2006.01)
(52) U.S. Cl. .................. 425/504; 425/389; 425/414; 425/294; 901/41; 901/30
(58) Field of Classification Search .............. 425/504, 425/389, 414, 294; 156/286; 901/41, 30; B29C 70/44
See application file for complete search history.

(56) References Cited

U.S. PATENT DOCUMENTS

| | | | | |
|---|---|---|---|---|
| 3,025,208 A | * | 3/1962 | Geiger | 156/382 |
| 3,382,530 A | * | 5/1968 | Glesner | 425/113 |
| 4,475,976 A | * | 10/1984 | Mittelstadt et al. | 156/286 |
| 4,549,864 A | * | 10/1985 | Larribe | 425/145 |
| 4,980,013 A | * | 12/1990 | Lowery | 156/443 |
| 5,648,109 A | * | 7/1997 | Gutowski et al. | 425/504 |
| 5,954,917 A | * | 9/1999 | Jackson et al. | 156/433 |
| 6,495,086 B1 | * | 12/2002 | Uytterhaeghe et al. | 264/322 |
| 6,814,916 B1 | * | 11/2004 | Willden et al. | 264/257 |
| 6,893,247 B1 | * | 5/2005 | Uytterhaeghe et al. | 425/397 |

OTHER PUBLICATIONS

Andrew E. Modin, SME Technical Paper EM93-105, "Hot Drape Forming of Thermoset Prepregs," Society of Manufacturing Engineers, Jan. 19-20, 1993, (13 pgs), U.S.
T. Gutowski, Advanced Composites Manufacturing, John Wiley & Sons, Inc.
P. de Luca, A.K. Pickett, PAM '98 PSI/ESI Group, Tours, France, "Industrial Examples of Forming Non-Metallic Parts Using Pam-Form," Oct. 8-9, 1998, (19 pgs), France.

* cited by examiner

*Primary Examiner*—Robert Davis
*Assistant Examiner*—G. Nagesh Rao
(74) *Attorney, Agent, or Firm*—Lee & Hayes, PLLC (57) ABSTRACT

A machine and a method for forming composite materials are provided. The machine includes a frame and at least one forming beam attached to the frame, the at least one beam being arranged to align with a mandrel. The forming beam is pivotally segmented into at least two segments to conform to the shape of the mandrel, or alternately is bendable to conform to the shape of the mandrel. The mandrel is receivable within the frame in alignment with the forming beam. An apparatus is also provided to position a composite charge over the mandrel, and to position the mandrel within the frame. A further apparatus is provided to transport the mandrel, and to urge the mandrel toward the forming beam, forming a composite charge.

19 Claims, 7 Drawing Sheets fig. 1 fig. 6 fig. 7C fig. 7B fig. 7A

COMPOSITE SPAR DRAPE FORMING MACHINE

RELATED APPLICATIONS

This application is related to concurrently filed patent application Ser. No. 10/233,270 entitled, "Forming Method for Composites," the contents of which are hereby incorporated by this reference.

FIELD OF THE INVENTION

This invention relates generally to the forming of composite fiber laminate parts, and, more specifically, to machine forming of composite materials.

BACKGROUND OF THE INVENTION

Composite materials, including carbon fiber epoxy impregnated laminates, are commonly used in applications requiring high strength and light weight. Forming composite material ply packages or charges has generally been done by hand, especially when the laminate plys of the composite materials exceed 0.25 inch in thickness. Forming large compound shaped composite material charges over a forming tool or mandrel can often take 2 to 3 days. The laid-up parts are then cured.

Machines have been utilized to form composite material charges over forming mandrel. However, these methods and systems have not been able to form composite charges with aggregate laminate ply thicknesses greater than 0.25 inches without buckling or out-of-plane fiber distortion. Further, machine forming systems have been configured for single part manufacturing and have not been reconfigurable. Alignment of the composite charges over the mandrels prior to forming has been difficult. Also, in multiple part manufacturing facilities, the storage, transport, and handling of mandrels and forming devices for different parts has been cumbersome, especially when multiple large parts, such as spars for aircraft, are being fabricated.

Therefore, a need exists for composite charge forming methods and systems which flexibly form a multitude of parts, including parts with complex surfaces or ply thicknesses greater than 0.25 inches, quickly align the composite charges relative to the forming mandrels, and provide efficient and space effective means for handling and operating the machine components required for forming large scale composite parts.

SUMMARY OF THE INVENTION

A machine and a method for forming composite materials are provided. The machine includes a frame and at least one forming beam attached to the frame, the at least one beam being arranged to align with a mandrel. The forming beam is pivotally segmented into at least two segments to conform to the shape of the mandrel, or alternately is bendable to conform to the shape of the mandrel. The mandrel is receivable within the frame in alignment with the forming beam.

An apparatus is also provided to position a composite charge over the mandrel and to position the mandrel within the frame. A further apparatus is provided to transport the mandrel and to urge the mandrel toward the forming beam to form a composite charge.

The present invention is re-configurable to mold different parts, provides for the efficient and accurate positioning of composite charges for forming, and provides space effective means for handling the machine components uses in forming composite parts.

BRIEF DESCRIPTION OF THE DRAWINGS

The preferred and alternative embodiments of the present invention are described in detail below with reference to the following drawings.

DETAILED DESCRIPTION OF THE INVENTION

A machine and a method for forming composite materials are provided. By way of overview, the machine includes a frame and at least one forming beam attached to the frame, the at least one beam being arranged to align with a mandrel. The forming beam is pivotally segmented into at least two segments to conform to the shape of the mandrel or alternately is bendable to conform to the shape of the mandrel. The mandrel is receivable within the frame in alignment with the forming beam.

An apparatus is also provided to position a composite charge over the mandrel and to position the mandrel within the frame. A further apparatus is provided to transport the mandrel and to urge the mandrel toward the forming beam.

Figure 1:
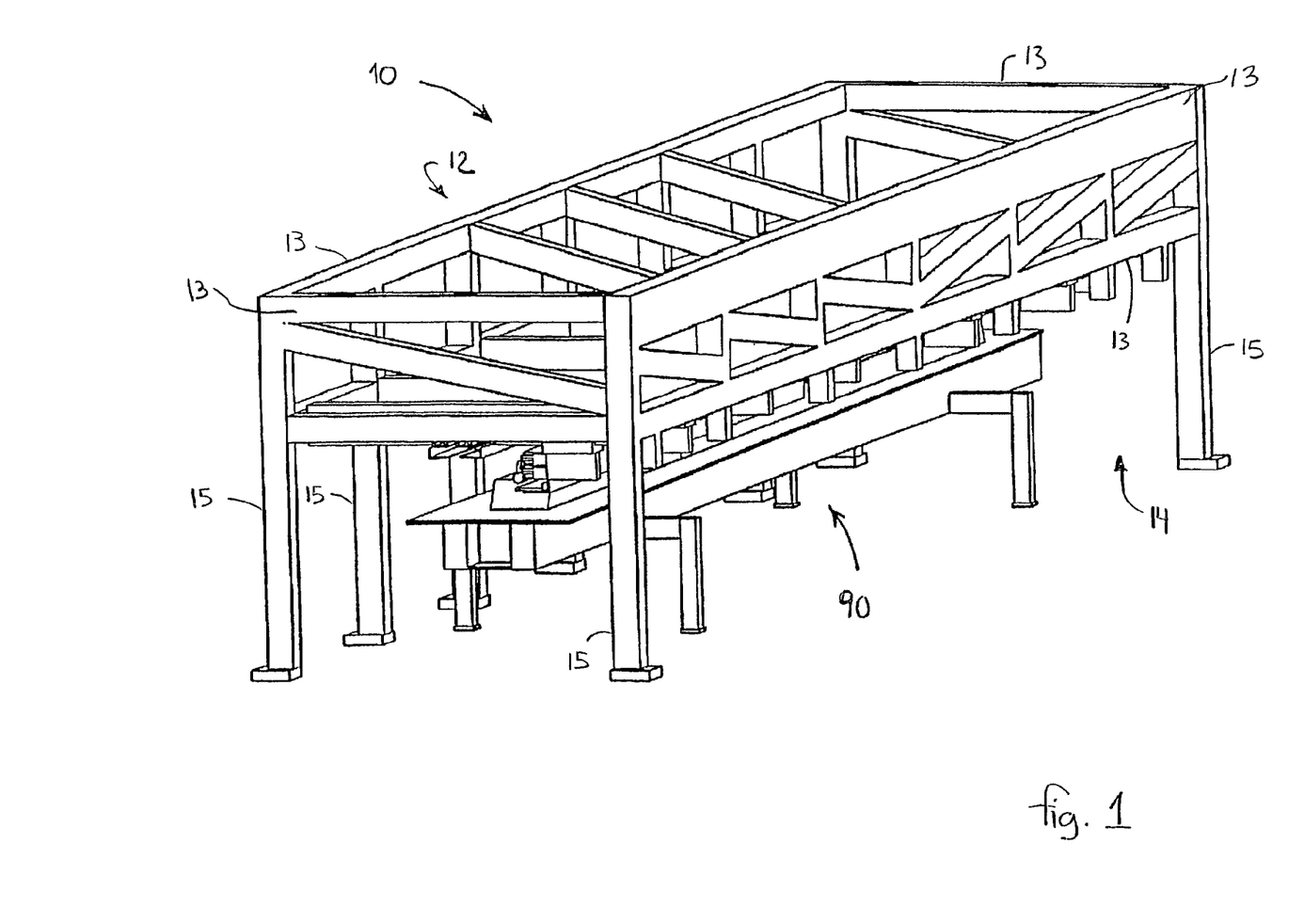
FIG. 1 is an isometric drawing of an example forming machine of the present invention.

FIG. 1 illustrates an example drape forming machine 10 of the present invention. In this embodiment, the machine 10 has a frame 12 with an open side 14. A mandrel tool 90 removably fits within the open side 14 of the frame 12. Composite parts such as beams and aircraft spars may be formed by the machine 10. Any suitable configuration of the frame 12 that allows the mandrel tool 90 to removably fit within the frame 12 may be utilized. By way of example, in lieu of an open side 14, the mandrel tool 90 may suitably be fitted into the frame 12 through an end.

In the embodiment shown in FIG. 1, the frame 12 is approximately 48 feet long, and the open side 14 allows access for a 43-foot long mandrel tool 90. The frame has a plurality of cross members 13 and legs 15. The frame 12 rests on a floor that has been leveled to plus or minus 0.1 inch. It will be appreciated that any suitable uniform floor or support may be utilized for the machine 10 and the mandrel tool 90.

Figure 2:
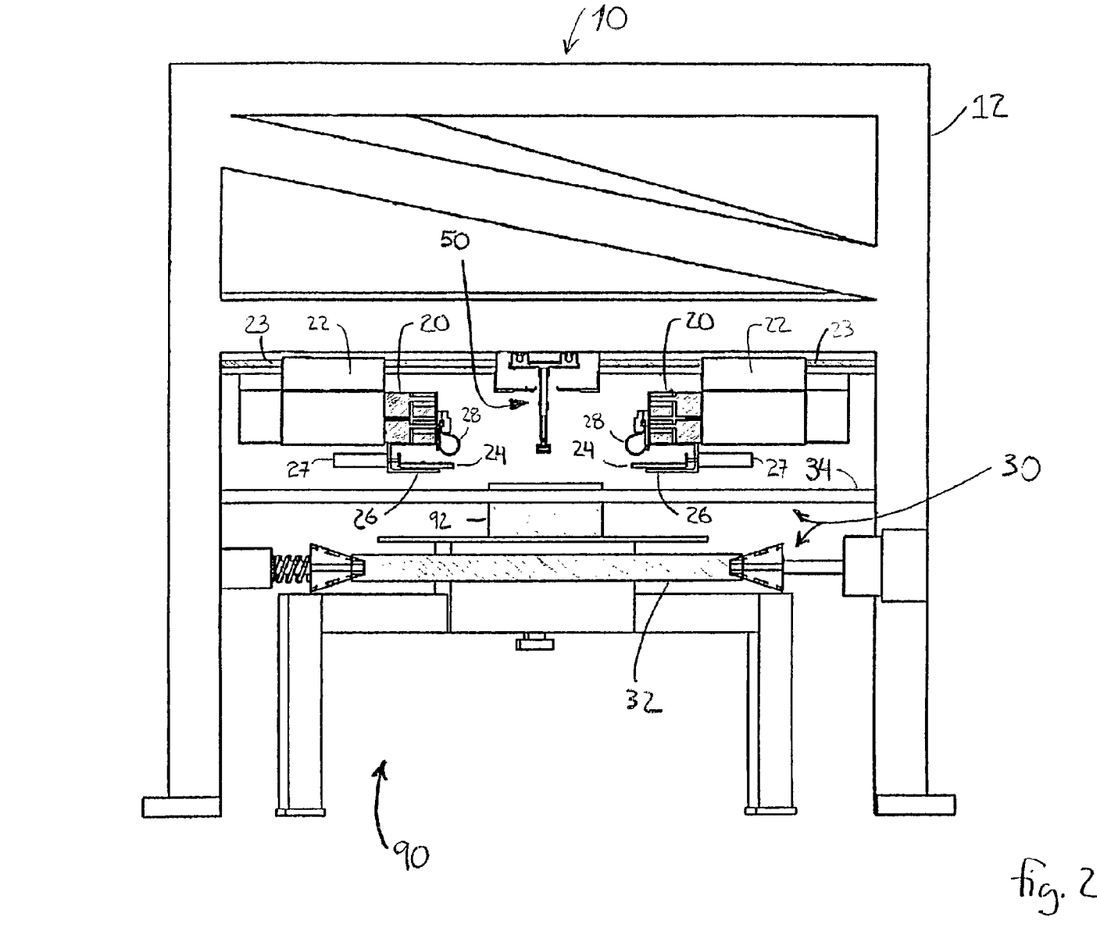
FIG. 2 is an end view of a forming machine of the present invention.

FIG. 2 is an end view of the example machine 10 illustrated in FIG. 1 and shows the details of the forming machine 10 and the mandrel tool 90. Movably attached to the frame 12 are forming beams 20 utilized to form a composite material charge (not shown) over a mandrel 92 attached to the mandrel tool 90. The mandrel 92 is shaped to form the part being molded by the machine 10 when the composite charge is molded over the mandrel 92. In this embodiment, the forming beams 20 are held by forming beam supports 22 which ride on linear bearings 23 attached to the frame 12. The linear bearings 23 allow the forming beams 20 to be positioned against the mandrel 92 for forming the composite charge over the mandrel 92. The forming beams are positioned utilizing acme screwjacks and servo motors (not shown). The forming beams 20 are suspended beneath the frame 12 of the machine 10 with the large linear bearings 23 allowing lateral movement of the beams. The forming beams 20 are segmented at the linear bearing 23 locations so that the forming beams can be bent or reconfigured to match tapers, doglegs, or large contours of the mandrel. It will be appreciated that flexibly positioning the segments of the forming beams 20 allows the machine 10 to be configured to match the shape of many different mandrels, and thus to form a wide variety of composite parts, such as spars with tapers or joggles or curved beams.

Actuators are located at the pivot points (not shown) between the segments of the forming beams 20. Although in this embodiment the actuators utilize acme screwjacks and servo motors (not shown), it will be appreciated that any suitable method of moving the forming beams and holding them in position relative to the mandrel 92 may be utilized. For example, the forming beams 20 are suitably actuated with pneumatic cylinders and set pins, hydraulic cylinders, electrical solenoids, linear motors, or scissor jacks. Forming bladders 28 are attached to the forming beams 20. In one embodiment, the forming bladders 28 suitably are inflated fire hose. It will be appreciated that any suitable flexible or pivoting material may be utilized to press the composite charge against the mandrel 92.

Also attached to the forming beams 20 are charge supports 26 which support the portions of the composite charge (not shown) which overhang the mandrel 92 before they are pressed against the mandrel tool by the forming bladder 28.

The combination of the forming beams 20, mandrel 92, and charge supports 26 implement the forming method of the above-identified related application, "Forming Method for Composites." It will also be appreciated that the machine of this invention and its component systems may be utilized in other forming methods.

The overhanging portions of the composite charge being urged against the mandrel 92 are held in an "S" shape by the forming bladder 28 and the charge support 26. This method minimizes the area and the amount of sliding where the composite charge laminate plys slide past one another as they are bent over the mandrel 92. The method also assists in maintaining the laminate plys in tension as the forming process occurs. Supporting the unformed portions of the composite charge and progressively bending the composite charge to maintain an "S" shape minimizes out-of-plane fiber distortion.

In the embodiment shown in FIG. 2, pinch bladders or plates are not utilized to hold the composite charge against the charge supports 26 during forming. Instead, the stiffness of the composite charge serves to hold the unformed portions of the composite charge against the charge supports 26, and thus substantially parallel with the upper surface of the mandrel 92. Substantially parallel suitably includes an angle ranging from parallel with the upper surface of the mandrel 92 (0°) to a small angle up to 20°. Thus, in this embodiment, forming occurs without a pinch bladder or a pinch plate.

The mandrel tool 90 with the mandrel 92 is lifted up within the frame 12 between the forming beams 20, thereby forming and molding the composite charge. In other embodiments, the forming beams 20 are lowered over a fixed mandrel 92. It will be appreciated that any suitable method and orientation of moving the forming beams 20 toward the mandrel 92 will accomplish forming of the composite charge.

Attached to the charge supports 26 are heater plates 24 that heat the composite charge, and soften it during the forming process. The heater plates 24 are positioned on the charge supports 26. The heater plates 24 can be extended or retracted toward the mandrel 92 by pneumatic cylinders 27 controlled by a drape former controller (not shown). Given by way of non-limiting example, the heater plates 24 are suitably 480 volts alternating current (VAC) resistance heaters sandwiched between aluminum plates with a non-metallic bumper on the edge that will touch the mandrel 92. However, other heat sources may be used as suitable for a particular application. By way of example, alternate heat sources may include hot air heat guns or infrared heaters. It will be appreciated that in some forming applications heater plates suitably would not be required to form the composite charge, and fixed or movable charge supports 26, without heater plates 24, would then support the composite charge during forming.

Movably attached to the frame 12 is a charge pulling device 50 that pulls the composite charge (not shown) lengthwise along and over the mandrel 92 and charge supports 26. The charge pulling device 50 thus loads the composite charge into the machine 10. The charge pulling device 50 is described in detail in connection with FIG. 6 below.

The machine 10 is equipped with a backing film remover 30. The backing film remover 30 removes a backing film (not shown) from the lower side of the composite charge (not shown) as it is drawn into the machine 10. Backing film (not shown) is utilized in some forming applications as a foundation for composite plies laid down by a computer numerically controlled (CNC) tape laying machine. The backing film remover includes a backing film roller 32 driven by a motor (not shown) which draws the backing film off the composite charge and onto the backing film roller 32. The backing film is typically a plastic sheet and is broken from the composite charge as the composite charge is drawn across a breaking bar 34. The breaking bar is attached to the frame 12. In this embodiment, the motor driving the backing film roller 32, through a slip clutch (not shown), operates at a slightly faster speed than the charge pulling device 50 pulling the composite charge across the breaking bar. This keeps the backing film under tension to remove the film from the composite charge without ripping. The backing film remover 30 is located at the end of the frame 12 where the composite charge is loaded into the machine 10. Given by way of non-limiting example, backing film roller 32 is suitably a disposable or replaceable roller. This system peels and removes the backing film from the bottom of the composite charge as it is being loaded into the machine 10 by the charge pulling device 50. A small radius corner of a square bar serves as the breaking bar 34 and breaks the bond between the backing film and the bottom of the composite charge. The film is then wound around the disposable backing film roller 32.

During forming, the mandrel tool 90 holding the mandrel 92 is lifted vertically within the frame 12. This pushes the mandrel 92 up between the forming beams 20 and molds the composite charge over the mandrel 92. The mandrel tool 90 is lifted by the tool transport and lifting device illustrated in FIGS. 5A and 5B.

The location and configurations of the forming beams 20 and the heater plates 24 are controlled by a drape former controller (not shown) which configures the forming beams 20 and the heater plates 24 in alignment with the mandrel in proper positions for forming the composite charge. The forming beams 20 match the shape of the mandrel 92. The heater plates 24 are positioned near or against the mandrel 92. The mandrel 92 may have curves, joggles, bends or offsets that are matched by the forming beams and heater plates, and are set in position by the drape former controller. It will be appreciated that any suitable machine controller may be utilized to configure the machine 10 for a given mandrel 92. Alternately, the forming beams 20 and heater plates 24 may be positioned manually using manual measurements.

Figure 3A:
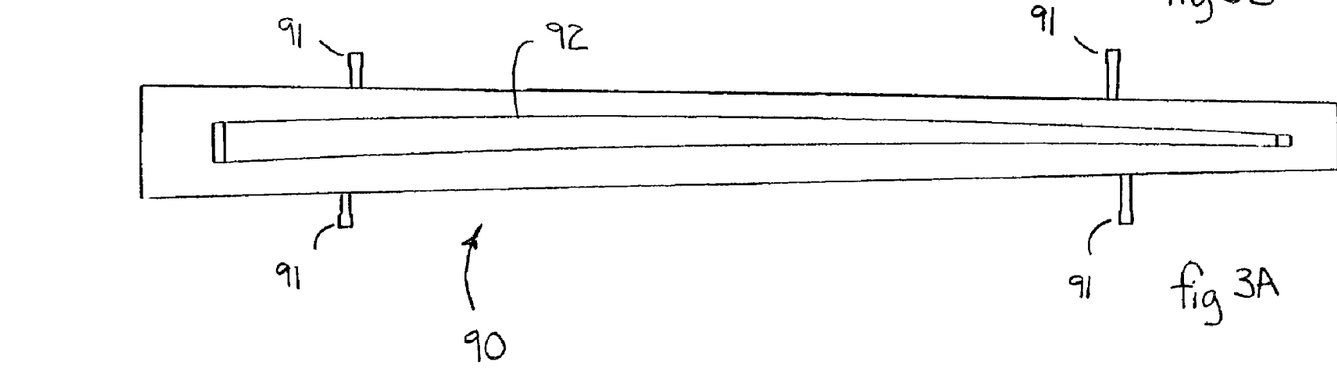
FIG. 3A is a top view of an example mandrel tool of the present invention.

FIG. 3A is a top view of an example mandrel tool 90. The mandrel tool is supported on legs 91. In this embodiment, the legs 91 are attached to the mandrel tool 90 and remain attached to the mandrel tool 90, even during forming. Thus, separate storage for the legs is not required, and the mandrel tool 90 may be stored on its own legs 91. Attached to the mandrel tool 90 is the mandrel 92 over which the composite materials or charges are formed. The mandrel 92 shown in FIG. 3A is curved along its length. The mandrel 92 may have any shape or configuration that permits forming of the composite charges with acceptable levels of out-of-plane fiber distortion.

Figure 3B:
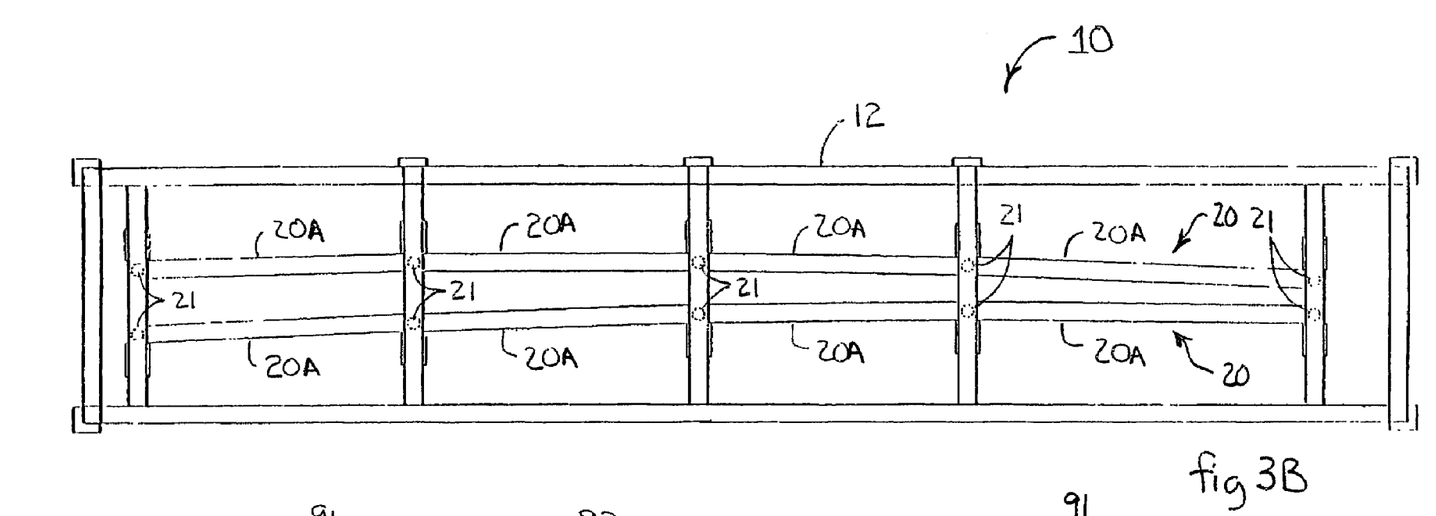
FIG. 3B is a top view of an example forming machine of the present invention.

FIG. 3B shows an exemplary embodiment of the machine 10 of the present invention configured to match the contours of the mandrel 92 (FIG. 3A). The two forming beams 20 are each divided along their length into four independently positionable segments 20A. The segments 20A are connected to each other by beam hinges 21. There are also beam hinges 21 at the ends of each forming beam 20. The beam hinges 21 are attached to actuators (not shown). The actuators are linked to the frame 12 of the machine 10, allowing the segments 20A to be positioned adjustibly and reconfigurably longitudinally or along their length defining a non-linear segmented longitudinal axis to match the contours or shape of the mandrel 92. The example embodiment shown in FIG. 3B shows the forming beams 20 configured for the mandrel 92 of FIG. 3A. In this example configuration, the forming beams 20 are more widely separated at one end than the other. The forming beams 20 as positioned in the example positions shown in FIG. 3A define convex and concave curves along their length matching the mandrel 92. It will be appreciated that the segments 20A may be adjustibly and reconfigurably positioned to match any mandrel 92 along its length. For example, the segments 20A need not be hinged but may be pivoted. By way of further example, the segments 20A need be not be directly connected to each other, but may be suitably separately and independently positionable, allowing greater flexibility for forming composite charges over complex shaped mandrels. Similarly, the forming beams 20 may be attached to the frame 12 in any suitable manner permitting the adjustment of their position relative to the mandrel 92. It will be appreciated that a frame 12 may not be necessary where suitable means are provided for positioning and moving the segmented forming beams 20 relative to the mandrel 92. For example, hydraulic systems mounted to the mandrel tool 90 or to a fixed surface could position and move the forming beams 20 relative to the mandrel 92 or could hold the forming beams 20 in a fixed position as the mandrel 92 is moved relative to the forming beams 20.

It will also be appreciated that a unitary flexible or bendable forming beam 20 would form a shape conformable to the mandrel 92 of FIG. 3A, in the same manner as a segmented forming beam 20. Similarly, one or more of the segments 20A may be flexible or bendable, providing versatility in conforming to complex mandrel 92 surfaces. By way of example, a bendable or flexible forming beam 20 or segment 20A may be flexed and held in place by actuators (not shown) in the same manner as a segmented forming beam 20.

In the example shown in FIG. 3B, the forming beams 20 each have 4 adjustable and reconfigurable segments along their length. In other embodiments a different number of segments may be used, such as a forming machine with 5 segment forming beams 20.

Figures 4A, 4B:
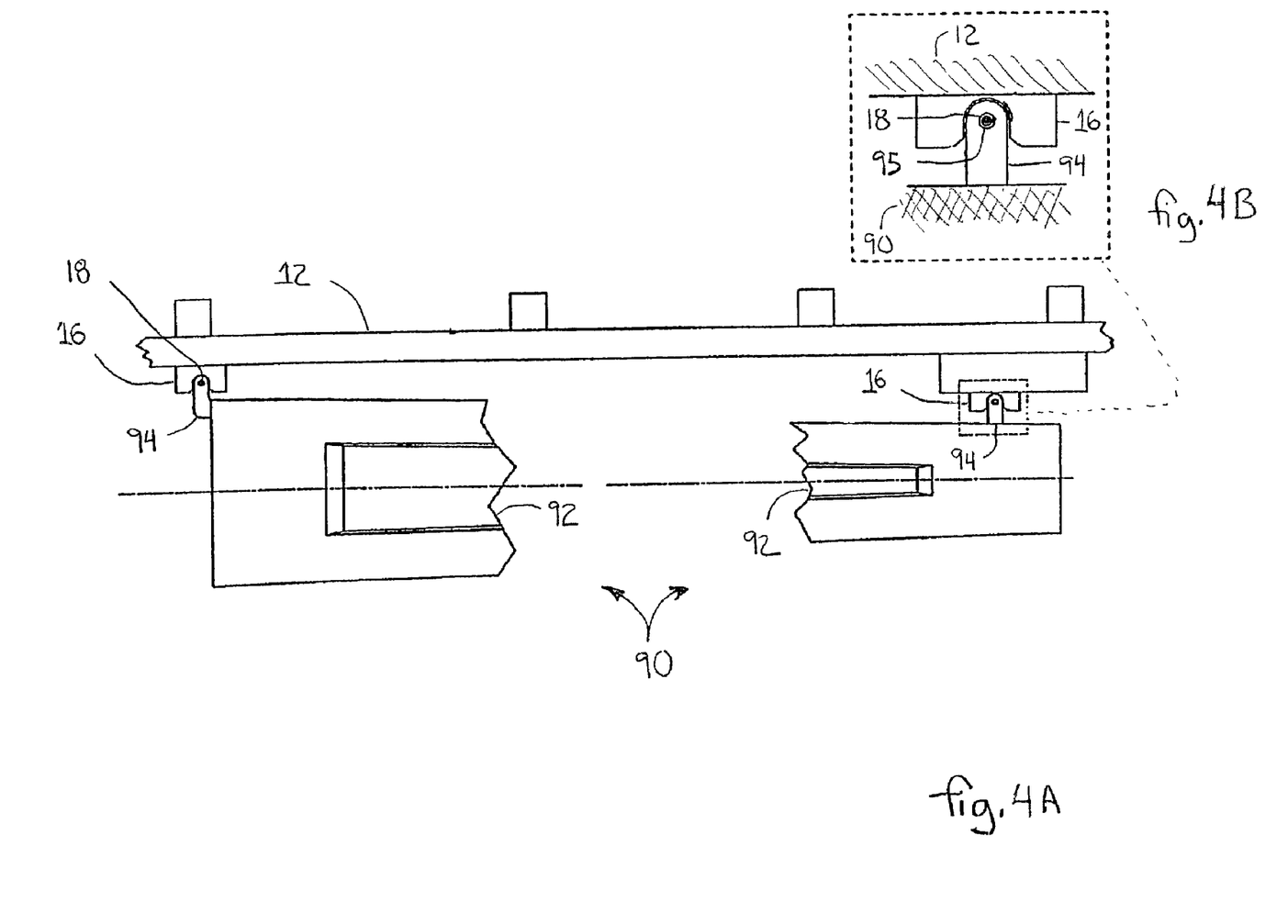
FIG. 4A is a top view of an example alignment of the mandrel tool and frame of the present invention.
FIG. 4B is an enlarged view of an example taper slot and locating pin of the present invention.

FIG. 4A shows an embodiment of the mandrel tool 90 positioning system and method of the present invention. The mandrel tool 90 is positioned against the frame 12. The mandrel tool 90 carries the mandrel 92. The mandrel tool 90 has two socket plates 94 which fit into slots 16 attached to the frame 12. The socket plates 94 fit into the slots 16. The mandrel tool 90 is then lowered, with locating holes 95 in the socket plates 94 sliding over chamfered locating pins 18 that position the mandrel tool 90 in a fixed location relative to the frame 12. When the socket plates 94 are inserted into the slot 16 and the mandrel tool 90 is lowered over the locating pins 18, the center line of the mandrel tool 90 is in alignment with the center line of the frame 12. It will be appreciated that the slots 16 and socket plates 94 may be tapered or rounded to suitably mate with each other, positioning the mandrel tool 90. It will also be appreciated the locating pin 18 need not be cylindrical or chamfered, but may be any suitable shape to match with the corresponding locating hole 95. By way of example the locating pin 18 may be tab shaped or pyramidal shaped. Alternately, by way of example, the slot 16 and the locating pin 18 may be attached to the mandrel tool 90, and the socket plates 94 and locating holes 95 maybe attached to the frame 12, positioning the mandrel tool 90 in a fixed location relative to the frame 12 in the same manner as the embodiment shown in FIG. 4A.

FIG. 4B is an enlarged top view of the mandrel tool 90 with its attached socket plate 94. The socket plate is rounded and slides into the corresponding slot 16 attached to the frame 12. The mandrel tool 90 with its attached socket plate 94 is then lowered over the chamfered pin 18, thereby positioning the mandrel tool 90. Positioning the mandrel tool 90 is accomplished by lifting and moving the mandrel tool 90 with a tool transport and lifting device, such as that shown in FIGS. 5A and 5B. The mandrel tool 90 is transported on air bearings to the machine 10 and positioned against the frame 12. The mandrel tool 90 is approximately located within the frame 12. Operators maneuver the mandrel tool 90 so that the rounded ends of the socket plates 94 line up with the tapered slots 16 attached to the frame 12 above the locating pins 18. In this example embodiment, tapered shape of the slot 16 helps guide the socket plates 94 into position. Air bearings on the tool transport and lifting device are deflated and the tool transport lifting device settles to the floor with the location of the mandrel tool 90 controlled by the locating holes 95 and the locating pins 18.

The mandrel tool 90 is thus aligned with the center line of the frame 12. With the air bearings deflated, the horizontal location of the mandrel tool 90 is fixed by friction on the floor. The mandrel tool 90, attached with the mandrel 92, may then be lifted up into the forming beams of the drape forming machine (not shown) in proper position for molding the composite charge. The position of the mandrel during forming is held fixed by the weight of the tool transport lifting device (not shown) underneath the mandrel tool 90 against the underlying floor. The mandrel tool 90 is thus located within plus or minus 0.1 inch relative to the forming machine frame 12. This system permits the location of a plurality of different mandrel tools 90 in the frame assembly 12. The socket plates 94 thus accurately locate the mandrel tool 90 within the frame 12. However, it will be appreciated that the precise position of the tool transport and lifting device (not shown) underneath the mandrel tool 90 is not critical to the process of positioning the mandrel tool 90 and lifting it up within the frame 12.

Figure 5A:
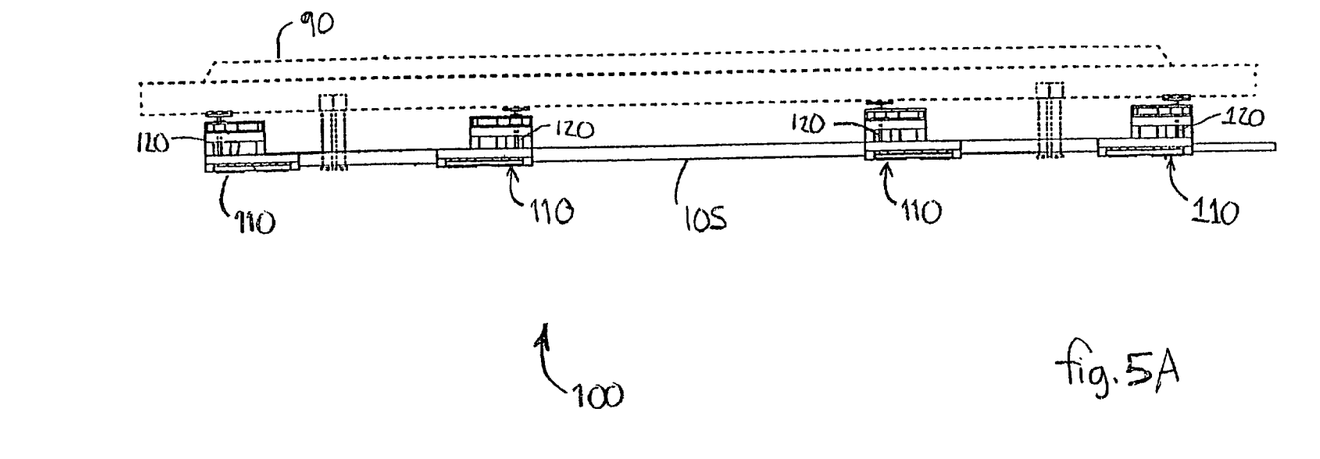
FIG. 5A is a side view of an example tool transport and lifting device of the present invention.

FIG. 5A is a side view of a tool transport and lifting device (TTLD) 100 which carries and lifts the mandrel tool 90 (shown in phantom). The TTLD 100 has a frame 105. Connected to the frame 105 are air bearings 110. Air bearings are commercially available items that are a low friction method to move the TTLD 100 and the mandrel tool 90 across a floor. Air bearings allow operators to roughly position the TTLD 100 and the mandrel tool 90 within the drape forming machine (not shown), without the need for additional power or assistance from the forming machine or any other equipment. It will be appreciated that any suitable method of moving the TTLD 100 may be utilized. For example, any acceptable form of high-load bearings or rollers could be used to move the TTLD 100.

Attached to the frame 105 are screwjacks 120 which lift the mandrel tool 90. In this embodiment, the TTLD 100 has four sets of air bearings 110 and four sets of screwjacks and motors 120. It will be appreciated that any suitable combination or number of air bearings 110 and screwjacks and motors 120 that lift the mandrel tool 90 for transport and uniform lifting into the drape forming machine (not shown) may be used.

Given by way of non-limiting example, the screwjacks and motors each suitably include a pair of acme screws driven by a drive motor. It will be appreciated that any suitable lifting devices, such as hydraulic lifts or the like, may be utilized.

Figure 5B:
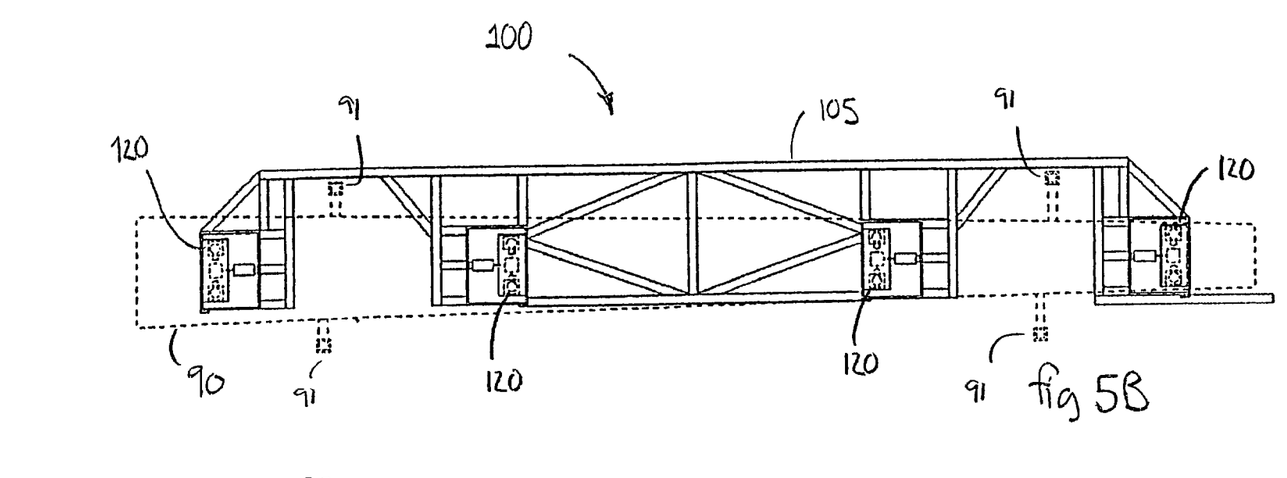
FIG. 5B is a top view of an example tool transport and lifting device of the present invention.

FIG. 5B is a top view of the TTLD 100. The frame 105 is configured to removably fit under the mandrel tool 90. The frame 105 is configured to fit around the legs 91 of the mandrel tool 90. This allows the TTLD 100 to be removably moved and slipped under mandrel tool 90, thereby allowing the mandrel tool 90 to be stored while the TTLD 100 is utilized with other mandrel tools. Attached to the frame 105 are four sets of screwjacks and motors 120 which lift the mandrel tool 90. In this embodiment, the TTLD 100 lifts the mandrel tool 90 without removing the legs 91 from the tool. As a result, separate jacks for each mandrel tool 90 and storage space for the legs is not required.

Figure 6:
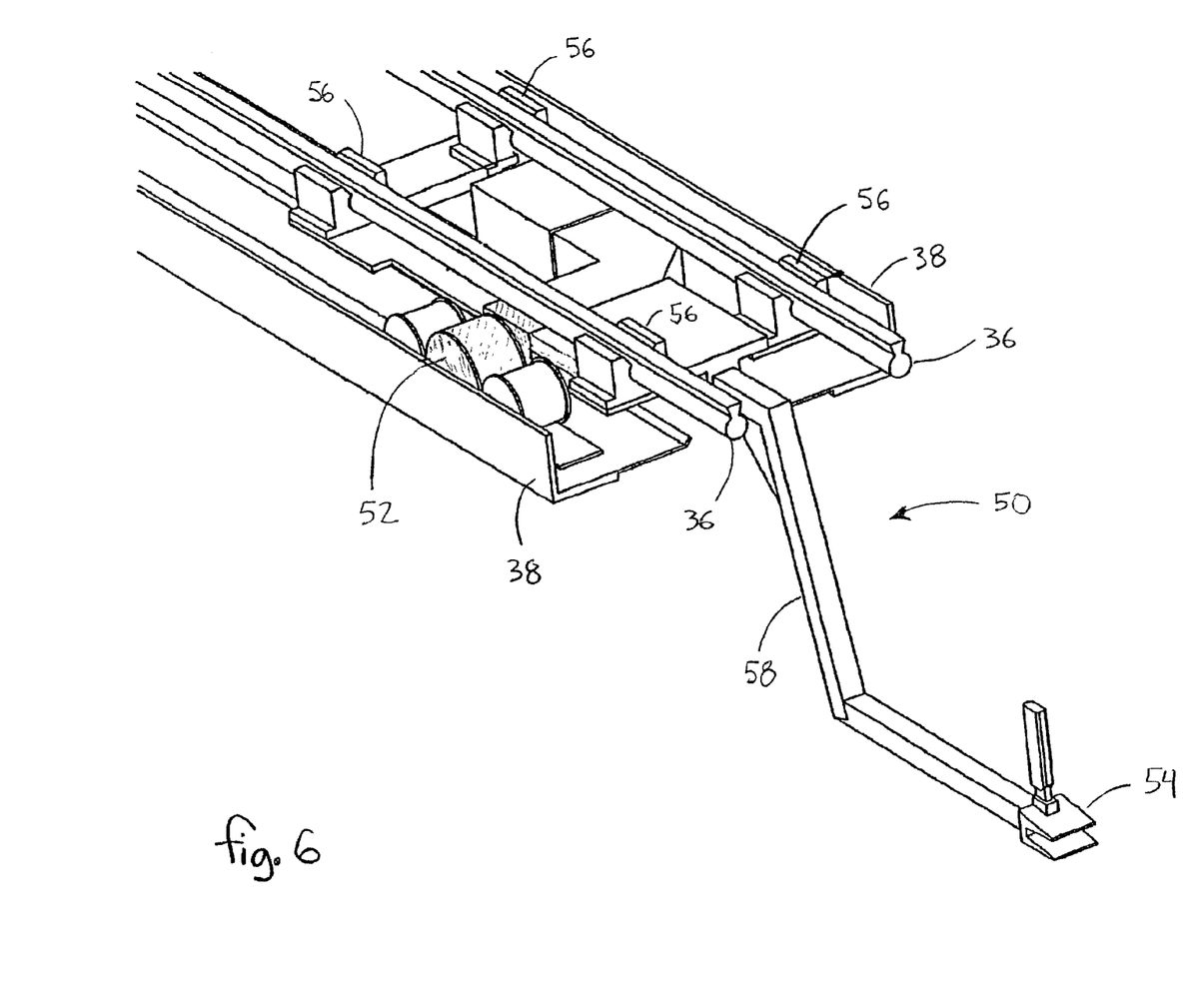
FIG. 6 is an isometric view of an example charge pulling device of the present invention.

FIG. 6 is an isometric view of the charge pulling device 50 which pulls a composite charge (not shown) into the drape forming machine (not shown). The charge pulling device 50 is suspended from linear bearings 36 attached to the frame 12 (not shown). The charge pulling device 50 has a pulling arm 58 which holds a charge clamp 54. The charge clamp 54 is removably attached to the charge pulling arm 58. In this embodiment, the charge pulling device has a locating feature (not shown) which is aligned with a target on the flat composite charge (not shown). A toggle-type clamp is then activated to accurately attach the charge clamp 54 to the composite charge. Accurately locating the charge clamp 54 on the composite charge permits the composite charge to be accurately positioned over the mandrel (not shown).

In one presently preferred embodiment, the composite charge is assembled by a CNC tape laying machine that lays plys in precise locations in the charge at alternating angles. After the charge clamp 54 is attached to the composite charge (not shown), the composite charge is brought to the drape forming machine and the charge clamp 54 is attached to the pulling arm 58.

The charge pulling device 50 rides on the linear bearings 36 attached to the drape former frame (not shown) with suitable charge pulling bearings or supports 56. The linear bearings 36 are located under the center line of the frame (not shown) of the drape forming machine.

The charge pulling device 50 is moved along the linear bearings 36 by a suitable drive system 52. The charge pulling device 50 loads the composite charge by towing it down the length of the drape forming machine. The drive system 52 engages suitable drive tracks 38 that are attached to the drape former frame (not shown). When the composite charge (not shown) is pulled lengthwise by the charge pulling device 50 into the drape forming machine, the composite charge slides on top of the top surface of the mandrel (not shown) and the heater plates (not shown).

Figure 7A:
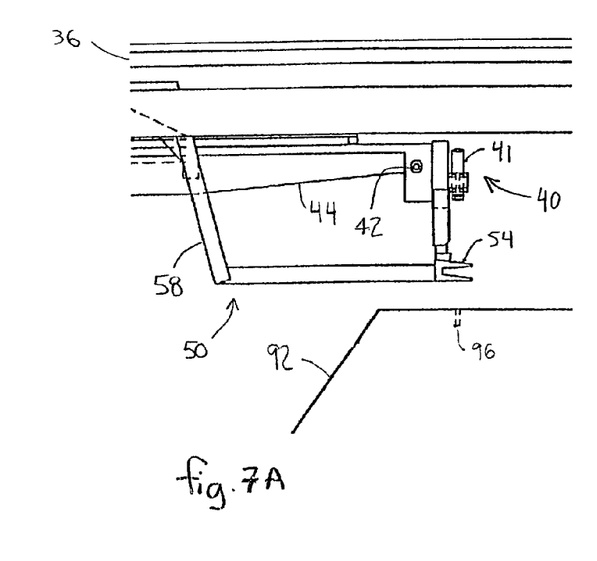
FIG. 7A is a left side view of an example charge alignment device of the present invention.

FIG. 7A shows a side view of the charge pulling device 50 and the composite charge alignment device 40. The charge pulling device 50 has a charge pulling arm 58 attached to a charge clamp 54. The charge pulling device 50 pulls the charge until it is stopped by the alignment device 40. The alignment device 40 has a projector boom 44 movably attached along the centerline of the drape forming machine frame (not shown). The projector boom 44 holds a projector 41, such as without limitation a laser projector, used to position the projector boom relative to the mandrel 92. The mandrel 92 has a tooling hole 96. The projector 41 is precisely aligned with the tooling hole 96 by moving the projector beam 44 along the centerline of the frame of the drape forming machine. This occurs when cross hairs or indicator projected by the projector 41 line up with the tooling hole 96. This fixes the projector boom 44 in a fixed position relative to the mandrel 92. The projector boom 44 has a proximity switch 42 which senses the presence of the charge pulling device clamp 54 as the charge pulling device 50 pulls the composite charge lengthwise into the drape forming machine. When the proximity switch 42 senses the charge clamp 54, the drape former controller (not shown) stops the charge pulling device 50 within a fixed distance. This positions the composite charge to within +/−1/64 inch lengthwise on the mandrel 92. The composite charge is pulled into the forming machine centered side to side on the mandrel 92, in this embodiment to within +/−1/8 inch. However, other tolerances may be used as desired for a particular application. It will also be appreciated that any suitable stopping method, including, by way of example, a hard stop that physically stops the charge pulling device 50, may be used to stop the charge pulling device 50.

Precise location of the composite charge with respect to the mandrel is often required for proper composite part fabrication. This is common for specialized parts such as aircraft spars. Precise location of the composite charge lengthwise within the drape forming machine permits ply drops, or the points where ply thicknesses change, to be positioned accurately with respect to the forming mandrel 92. For aircraft spars, typically, ply drops are positioned lengthwise along the spar to within +/−0.1 inch. This permits the composite parts to be precisely formed with the shapes, thicknesses and strengths for which they are designed. However, other tolerances may be used as desired for a particular application.

The method of aligning the composite charge in this embodiment thus includes projecting a cross-hair pattern or indicator on to the top surface of the mandrel 92. An operator aligns the projector 41 laser cross-hairs to the marker or tooling hole 96 on the mandrel 92, and then locks the projector boom 44 into place. The boom 44, with its proximity switch 42, is then properly located with respect to the mandrel 92. The proximity switch 42 is then used by the drape former controller (not shown) to stop the flat composite charge in the correct location with respect to the mandrel tooling hole 96. The projector 41 is also used by the operator to verify that the flat composite charge is properly located after the charge is pulled into the drape forming machine. The operator visually verifies that the laser cross-hairs projected by the projector 41 fall within the borders of a mark or a target on the flat composite charge, thereby verifying its proper alignment. In one embodiment, the mark on the composite charge is an inkjet target placed by a CNC laminate tape laying machine at the end of the composite charge lay up process. This provides verification that the composite charge is properly located laterally and longitudinally on the mandrel 92 surface.

It will be appreciated that the charge pulling device 50 and alignment device 40 properly position the composite charge lengthwise across the mandrel 92 and ensure the proper side-to-side position of the composite charge at the end being pulled. At the opposite end of the drape forming machine (not shown), suitable lateral sliding guides linked to the heater plates center the composite charge side-to-side as the composite charge is being pulled into the drape forming machine by the charge pulling device 50. It will be appreciated that any suitable method may be used to ensure that the end of the composite charge away from the charge pulling device 50 is centered side-to-side over the mandrel 92.

Figure 7B:
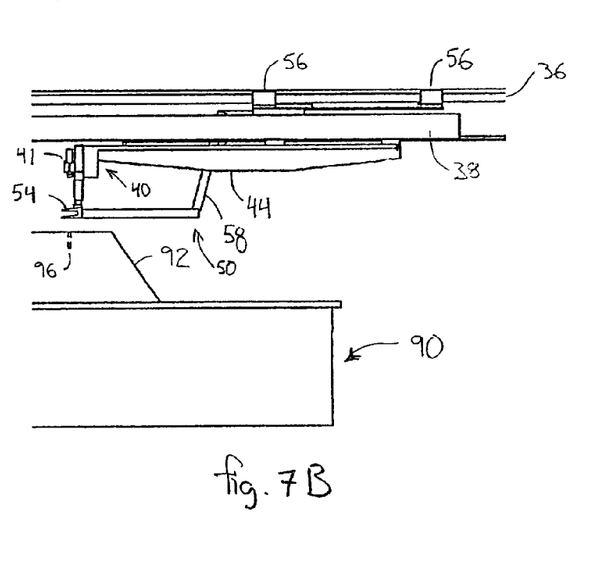
FIG. 7B is a right side view of an example charge alignment device of the present invention.

FIG. 7B is a right side view of the charge pulling device 50 and the alignment device 40. The charge pulling device 50 rides on linear bearings 36 attached to the drape former frame (not shown) held on suitable charge pulling supports 56. The charge pulling device is driven by a charge pulling device drive system (not shown) utilizing pulling drive tracks 38 attached to the drape former frame (not shown). The charge pulling device 50 has a pulling arm 58, with a detachable charge clamp 54. The charge pulling device 50 is shown here in alignment with the alignment device 40. The alignment device 40 has a projector boom 44 which holds a projector 41. The projector 41 allows indexing of the projector boom 44 relative to the tooling hole 96 in the mandrel 92. The mandrel 92 is attached to the mandrel tool 90 which has been previously positioned by the tool transport and lifting device within the frame of the drape forming device (not shown).

It will be appreciated that alternate indexing systems other than a laser light projector may be utilized by the alignment device 40. Any suitable indexing or measuring system that allows the position of the composite charge to be precisely located may be utilized by the present invention.

Figure 7C:
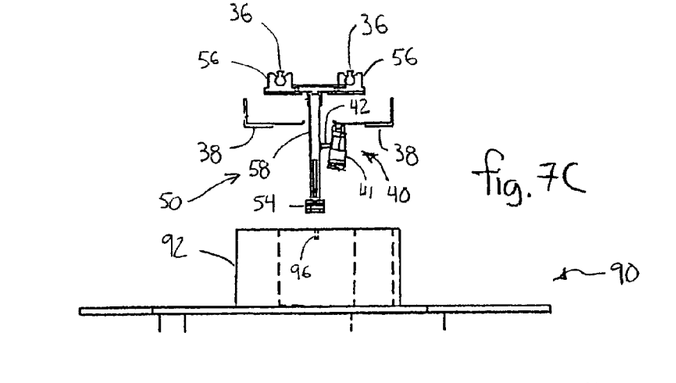
FIG. 7C is a front view of an example charge alignment device of the present invention.

FIG. 7C is a front view of the charge pulling device 50 and the alignment device 40 positioned over the mandrel 92. The charge pulling device 50, pulling supports 56, and the supporting linear bearings 36 attached to the drape former frame (not shown) are shown in cross-section. The charge pulling device 50 rides on the linear bearings 36 thereby pulling the composite charge utilizing the pulling arm 58 attached to the charge clamp 54.

The alignment device 40 includes the projector 41 and the proximity switch 42 attached to the projector boom 44 (not shown). The projector 41 is aligned with the tooling hole 96 in the mandrel 92 thereby properly positioning the alignment device 40 The alignment device 40 through the drape former controller (not shown) controls and stops the charge pulling device 50 at the proper location over the mandrel 92. The mandrel 92 is attached to the mandrel tool 90. After the charge is positioned, the entire mandrel tool 90 is lifted up within the drape forming machine molding and forming the composite charge.

Forming a composite charge using the present invention is thus a multi-step process. In one present embodiment, the mandrel tool 90 is brought to the drape forming machine 10. The operator scans a barcode on the mandrel tool 90 and a related work order, so that the drape forming machine can be configured properly. The drape former controller (not shown) compares part number information from the barcode scans, and then configures the forming beams 20 to match the forming mandrel 92.

After the forming beams 20 are configured properly, the tool transport lifting device 100 has its air bearings 110 inflated and the tool transport and lifting device 100 is removed from its storage position under the drape forming machine 10. The tool transport and lifting device 100 is moved under the mandrel tool 90. The tool transport lifting device 100 is roughly positioned under the mandrel tool 100, and the air bearings 110 are deflated. The acme screwjacks and motors 120 on the tool transport and lifting device 100 are extended to lift the mandrel tool 90 to a transportation elevation. Air bearings 110 on the tool transport and lifting device 100 are then reinflated and the operators move the mandrel tool to under the drape forming machine 10.

The mandrel tool 90 on the tool transport and lifting device 100 is then approximately located in the drape former frame 12. The operators maneuver the mandrel tool 90 so that the rounded ends of the socket plates 94 line up with the slots 16 over the chamfered locating pins 18. The tool transport and lifting device air bearings 110 are deflated and the pins 18 keep the mandrel tool 90 from moving as the tool transport and lifting device 100 and the mandrel tool 90 settle to the floor. This locates the mandrel tool 90 to within approximately 0.1 inch within the drape forming machine 10. The drape former controller then activates the tool transport and lifting device 100 to raise the mandrel tool 92 up to a charge loading position. The charge loading position is suitably defined as the top of the mandrel 92 just above the drape former heater plates 24. The heater plates 24 on their charge supports 26 are then moved so that their bumpers rest against the side of the mandrel 92.

The operators then prepare the drape forming machine 10 so that the composite charge can be loaded. The operators first set and lock the alignment device 40 so that the cross-hairs projected by the projector 41 is located on a tooling hole 96 in the mandrel 92. The operator next has the drape forming machine controller move the charge pulling device 50 to the loading end of the drape forming machine 10. The removable charge clamp 54 is removed from the charge pulling device 50 and accurately attached to the flat composite charge. The charge clamp 54 is aligned to the composite charge by locating a feature on the clamp 54 with a target on the flat composite charge. The operator attaches the removable charge clamp 54 to the charge pulling device arm 58. The operator then connects the protective backing film from the bottom of the flat composite charge to the backing film roller 32 of the backing film remover 30. Preparation for charge loading is then complete.

The operator then directs the drape forming machine controller to load the charge on the drape forming machine by activating the charge pulling device 50 and the backing film remover 30. The charge is towed lengthwise into the drape forming machine 10 at a constant speed by the charge pulling device 50. As the charge is pulled into the drape forming machine 10, the backing film remover 30 operates at a higher speed than the charge pulling device 50 and with a slip clutch maintains tension on the backing film thereby removing the backing film from the composite charge. Just before the stopping point for the charge pulling device 50, a target on the charge pulling device activates a proximity switch 42 on the alignment device 40. The drape forming machine controller then decelerates the composite charge and accurately stops the composite charge a precise distance later. The composite charge is then located directly in reference to the mandrel 92. The operator then visually verifies the location of the composite charge by checking to see if cross-hairs projected by the projector 41 fall on a target on the charge. Guides on the loading end of the forming machine 10 keep the composite charge centered side-to-side over the mandrel 92. The operator then removes the charge clamp 54 from the composite charge and moves the charge pulling device 50 out of the way of the forming beams 20. The alignment device 40 is similarly moved out of the way. The operator then verifies that the backing film remover 30 has removed all of the film from the bottom of the charge.

The operator then activates the drape former controller to implement the composite forming method described in the related application, "Forming Method for Composites." This process includes heating the charge with the heater plates 24 and then using the tool transport and lifting device 100 to lift the mandrel 92 up into the drape forming machine 10 past the forming beams 20. Forming bladders 28 force the charge to conform to the mandrel 92 contours as the unformed portions of the composite charge are held substantially parallel to the upper surface of the mandrel 92 by the heater plates 24 and charge supports 26. Substantially parallel suitably may be an angle ranging from parallel with the upper surface of the mandrel 92 (i.e. 0°) to a small angle of up to 20°. This process molds the composite part in a manner that minimizes out-of-plane fiber distortion and buckles even when complex shapes with joggles, off-sets, and contours are formed.

The heater plates 24 are turned off and the molded composite charge is allowed to cool. The forming bladders 28 then are deflated and the heater plates 24 and charge supports 26 are retracted. The forming beams 20 are retracted. The tool transport and lifting device 100 then lowers the mandrel 92 and mandrel tool 90 along with the molded part back to an elevation where they may be transported. The operators then activate the air bearings 110 on the tool transport and lifting device 100 and move the mandrel with the molded composite charge to a vacuum bagging location where the molded charge is cured. The tool transport and lifting device 100 then lowers the mandrel tool 90 to the floor, and the tool transport and lifting device 100 can be returned to the drape forming machine 10 for further use.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for forming composite materials, the apparatus comprising:
   a frame;
   at least one beam attached to the frame, the at least one beam being segmented longitudinally into at least two segments, the at least two segments being adjustably and reconfigurably arrangeable along a length of the beam with respect to each other to form a shape for forming a composite charge; and
   a mandrel, having a first surface, the mandrel being receivable within the frame in alignment with the at least one beam, the mandrel being arranged to form the composite charge when the mandrel is received within the frame;
   wherein the at least one beam includes a forming device that is arranged to urge the composite charge against the mandrel, wherein the forming device includes a forming bladder.

2. The apparatus of claim 1, wherein the at least two segments are pivotably attached to each other.

3. The apparatus of claim 1, wherein the at least two segments are independently positionable.

4. The apparatus of claim 1, further comprising at least one support that is attached to the frame and arranged to support a portion of the composite charge that overhangs the mandrel substantially parallel with the first surface.

5. The apparatus of claim 1, further comprising at least one positioning device that is attached to the frame and arranged to position the composite charge against the mandrel.

6. The apparatus of claim 5, wherein the positioning device includes a projector that is arranged to project an indicator onto the mandrel.

7. The apparatus of claim 1, further comprising at least one pulling device that is attached to the frame and arranged to pull the composite charge over the mandrel.

8. The apparatus of claim 1, further comprising at least one heater that is attached to the frame and arranged to heat a portion of the composite charge that overhangs the mandrel.

9. The apparatus of claim 1, further comprising a moving device that is arranged to transport the mandrel toward the frame and urge the mandrel against the beam.

10. An apparatus for forming composite materials, comprising:
    a frame;
    at least one beam attached to the frame, the at least one beam having a length, the at least one beam being adjustably and reconfigurably conformable along the length into a shape for forming a composite charge;
    a mandrel having a first surface, the mandrel being receivable within the frame in alignment with the at least one beam, the mandrel being arranged to form the composite charge when the mandrel is received within the frame; and
    a lifting device configured to raise the mandrel at least partially into the frame.

11. The apparatus of claim 10, wherein adjustably and re-configurably conformable along the length includes flexibly conformable.

12. An apparatus for forming composite materials, the apparatus comprising:
    a frame;

at least one beam attached to the frame, the at least one beam being longitudinally segmented into at least two segments, the at least two segments being adjustably orientable with respect to each other to define a variety of non-linear segmented longitudinal axes;

a mandrel with a first surface, the mandrel receivable within the frame in alignment with the at least one beam, the mandrel being arranged to form a composite charge;

a pulling device movably attached to a frame to pull a composite charge to a predetermined location on the mandrel;

an indexing device arranged to stop the pulling device when the composite charge is at the predetermined location on the mandrel; and a transport device, arranged to transport the mandrel and lift the mandrel into the frame.

13. The apparatus of claim 12, further comprising at least one support attached to the frame and arranged to support a portion of the composite charge that overhangs the mandrel substantially parallel with the first surface.

14. The apparatus of claim 12, further comprising at least one heater that is attached to the frame and arranged to heat a portion of the composite charge that overhangs the mandrel.

15. The apparatus of claim 12, wherein the at least one beam includes a forming bladder arranged to urge the composite charge against the mandrel.

16. The apparatus of claim 12, wherein the mandrel defines a mark used for positioning the indexing device.

17. An apparatus for forming a composite material, comprising:

at least one elongated beam adjustably conformable along its length;

an elongated mandrel having a forming surface configured to cooperate with the at least one elongated beam to form the composite material; and a lifting device configured to raise the mandrel to position the forming surface proximate the at least one elongated beam.

18. The apparatus of claim 17, further comprising a frame coupled to the at least one elongated beam and configured to position the at least one elongated beam over the mandrel and oriented to cooperate with the forming surface.

19. The apparatus of claim 17, wherein the at least one elongated beam includes an inflatable member configured to urge the composite material into engagement with the forming surface of the mandrel.

* * * * *